(12) United States Patent
Singasani et al.

(10) Patent No.: US 11,842,559 B1
(45) Date of Patent: Dec. 12, 2023

(54) APPLICATION OF DIFFERENT BIAS VOLTAGES TO REGIONS OF AN ULTRASONIC FINGERPRINT SENSOR

(71) Applicant: QUALCOMM Incorporated, San Diego, CA (US)

(72) Inventors: Chandrika Singasani, Secunderabad (IN); Nirma Lnu, Jhunjhunu (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/055,184

(22) Filed: Nov. 14, 2022

(51) Int. Cl.
  *G06V 40/13* (2022.01)
  *B06B 1/02* (2006.01)
  *G06F 3/043* (2006.01)

(52) U.S. Cl.
  CPC ............ *G06V 40/1306* (2022.01); *B06B 1/02* (2013.01); *G06F 3/043* (2013.01)

(58) Field of Classification Search
  None
  See application file for complete search history.

(56) References Cited

U.S. PATENT DOCUMENTS

| 2009/0033615 | A1* | 2/2009 | Cho | G09G 3/3426 345/102 |
| 2016/0092716 | A1* | 3/2016 | Yazdandoost | G06V 40/1306 382/124 |
| 2019/0096329 | A1* | 3/2019 | Kwon | G09G 3/3258 |

\* cited by examiner

*Primary Examiner* — Joseph R Haley
(74) *Attorney, Agent, or Firm* — QUALCOMM Incorporated

(57) ABSTRACT

Methods, devices and systems for controlling an ultrasonic fingerprint sensor are disclosed. Some examples involve determining that a first bias voltage is not sufficient for one or more affected ultrasonic receiver pixels of the ultrasonic receiver array and determining one or more affected regions of the ultrasonic receiver array in which the one or more affected ultrasonic receiver pixels are located. Some examples involve determining one or more unaffected regions of the ultrasonic receiver array in which the one or more affected ultrasonic receiver pixels are not located. Some examples involve determining a second bias voltage for the one or more affected regions and recalibrating the ultrasonic fingerprint sensor to apply the second bias voltage to the affected regions and to apply the first bias voltage to the one or more unaffected regions when the ultrasonic receiver array receives ultrasound signals.

30 Claims, 6 Drawing Sheets

APPLICATION OF DIFFERENT BIAS VOLTAGES TO REGIONS OF AN ULTRASONIC FINGERPRINT SENSOR

TECHNICAL FIELD

This disclosure relates generally to ultrasonic sensors and related methods, devices and systems, particularly to calibrating ultrasonic fingerprint sensor systems.

DESCRIPTION OF THE RELATED TECHNOLOGY

Biometric authentication can be an important feature for controlling access to devices, etc. Many existing products include ultrasonic fingerprint sensors for biometric authentication. Although calibration methods for ultrasonic fingerprint sensors do exist, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in a method of controlling an ultrasonic fingerprint sensor. In some examples, the method may involve determining, by a control system of a device that includes the ultrasonic fingerprint sensor, that a first bias voltage, which has been applied during time intervals in which an ultrasonic receiver array of the ultrasonic fingerprint sensor has been receiving ultrasound signals, is not sufficient for one or more affected ultrasonic receiver pixels of the ultrasonic receiver array. In some examples, the method may involve determining, by the control system, one or more affected regions of the ultrasonic receiver array in which the one or more affected ultrasonic receiver pixels are located. In some examples, the method may involve determining, by the control system, one or more unaffected regions of the ultrasonic receiver array in which the one or more affected ultrasonic receiver pixels are not located. In some examples, the method may involve determining, by the control system, a second bias voltage for the one or more affected regions. In some examples, the method may involve recalibrating, by the control system, the ultrasonic fingerprint sensor to apply the second bias voltage to the affected regions and to apply the first bias voltage to the one or more unaffected regions when the ultrasonic receiver array receives ultrasound signals.

According to some examples, the first bias voltage may correspond to a voltage determined during a factory calibration process. In some examples, the first bias voltage may correspond to a bias voltage determined during a prior recalibration process.

In some examples, the one or more affected ultrasonic receiver pixels may be temporarily malfunctioning ultrasonic receiver pixels. In some examples, the one or more affected regions and the one or more unaffected regions may be determined during a process of evaluating each region of a plurality of regions of the ultrasonic receiver array.

According to some examples, the ultrasonic receiver array may include a plurality of tiles, each tile of the plurality of tiles including a plurality of ultrasonic receiver pixels. In some examples, the affected regions and the unaffected regions each may include a plurality of tiles. However, in some examples, the affected regions and the unaffected regions each may include a single tile.

According to some examples, each region of the ultrasonic receiver array may occupy less than half of the ultrasonic receiver array. In some such examples, each region of the ultrasonic receiver array may occupy approximately $1/4$, $1/6$, $1/8$, $1/10$, $1/12$ or $1/16$ of the ultrasonic receiver array.

Other innovative aspects of the subject matter described in this disclosure may be implemented in an apparatus. The apparatus may include an ultrasonic fingerprint sensor and a control system configured for communication with the ultrasonic fingerprint sensor. The ultrasonic fingerprint sensor may include an ultrasonic receiver array. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to determine that a first bias voltage, which has been applied during time intervals in which the ultrasonic receiver array has been receiving ultrasound signals, is not sufficient for one or more affected ultrasonic receiver pixels of the ultrasonic receiver array. In some examples, the control system may be configured to determine one or more affected regions of the ultrasonic receiver array in which the one or more affected ultrasonic receiver pixels are located. According to some examples, the control system may be configured to determine one or more unaffected regions of the ultrasonic receiver array in which the one or more affected ultrasonic receiver pixels are not located. In some examples, the control system may be configured to determine a second bias voltage for the one or more affected regions. According to some examples, the control system may be configured to recalibrate the ultrasonic fingerprint sensor to apply the second bias voltage to the affected regions and to apply the first bias voltage to the one or more unaffected regions when the ultrasonic receiver array receives ultrasound signals.

In some examples, the one or more affected ultrasonic receiver pixels may be temporarily malfunctioning ultrasonic receiver pixels. In some examples, the first bias voltage may correspond to a voltage determined during a factory calibration process. According to some examples, the first bias voltage may correspond to a bias voltage determined during a prior recalibration process.

According to some examples, the one or more affected regions and the one or more unaffected regions may be determined during a process of evaluating each region of a plurality of regions of the ultrasonic receiver array. In some examples, the ultrasonic receiver array may include a plurality of tiles, each tile of the plurality of tiles including a plurality of ultrasonic receiver pixels. In some such examples, the affected regions and the unaffected regions each may include a plurality of tiles. However, in some examples, the affected regions and the unaffected regions each may include a single tile.

According to some examples, each region of the ultrasonic receiver array may occupy less than half of the ultrasonic receiver array. In some such examples, each region of the ultrasonic receiver array may occupy approximately $1/4$, $1/6$, $1/8$, $1/10$, $1/12$ or $1/16$ of the ultrasonic receiver array.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. According to some examples, the method may involve determining that a first bias voltage, which has been applied during time intervals in which the ultrasonic receiver array has been receiving ultrasound signals, is not sufficient for one or more affected ultrasonic receiver pixels of the ultrasonic receiver array. In some examples, the method may involve determining one or more affected regions of the ultrasonic receiver array in which the one or more affected ultrasonic receiver pixels are located. According to some examples, the method may involve determining one or more unaffected regions of the ultrasonic receiver array in which the one or more affected ultrasonic receiver pixels are not located. In some examples, the method may involve determining a second bias voltage for the one or more affected regions. According to some examples, the method may involve recalibrating the ultrasonic fingerprint sensor to apply the second bias voltage to the affected regions and to apply the first bias voltage to the one or more unaffected regions when the ultrasonic receiver array receives ultrasound signals.

In some examples, the first bias voltage may correspond to a voltage determined during a factory calibration process. According to some examples, the first bias voltage may correspond to a bias voltage determined during a prior recalibration process.

In some examples, the one or more affected ultrasonic receiver pixels may be temporarily malfunctioning ultrasonic receiver pixels. According to some examples, the one or more affected regions and the one or more unaffected regions may be determined during a process of evaluating each region of a plurality of regions of the ultrasonic receiver array.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
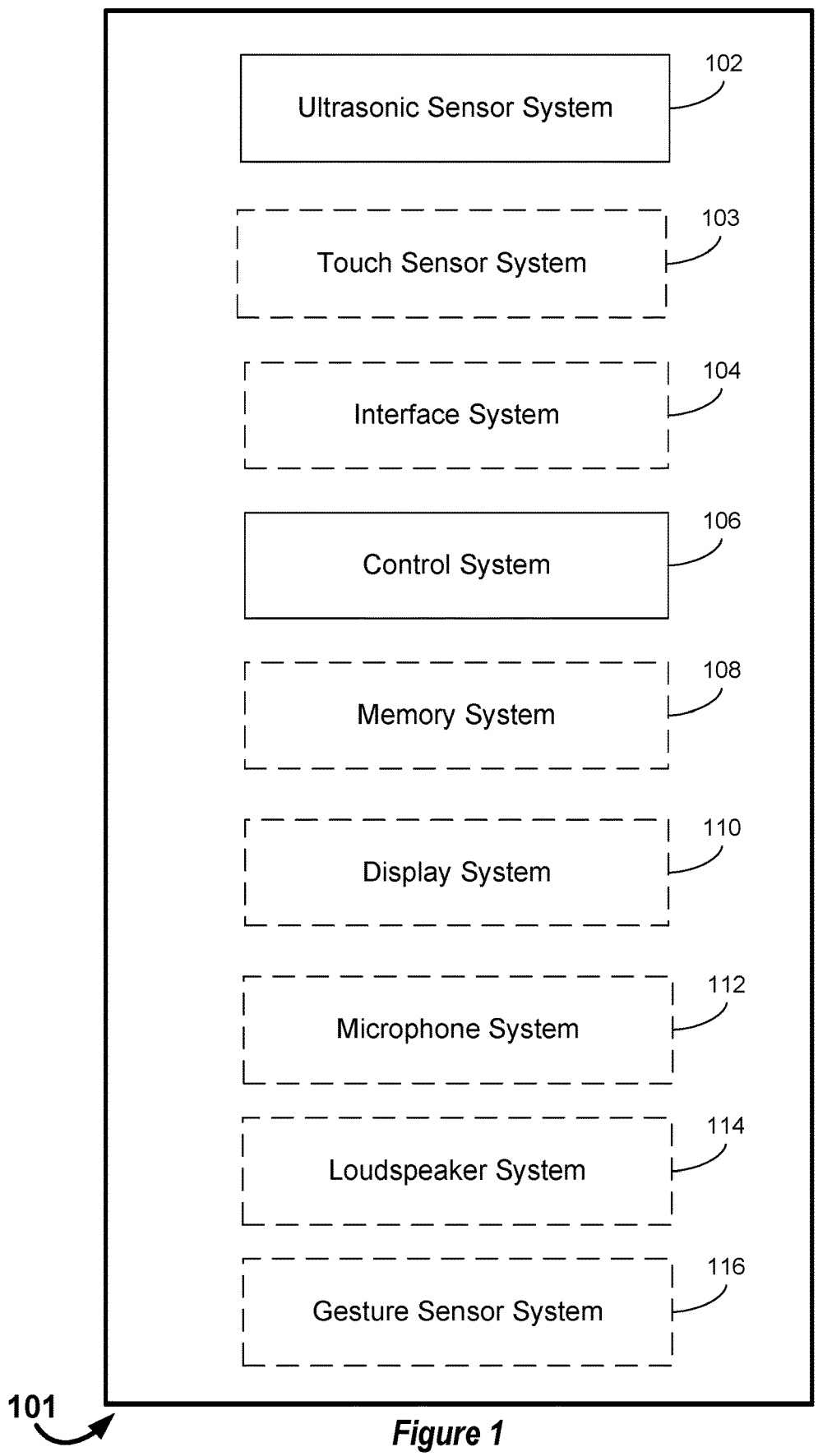
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Dbias is a direct current (DC) voltage that applied to an ultrasonic receiver to during a time interval when ultrasonic waves are received. (The terms "Dbias" "Dbias voltage" and "bias voltage" may be used synonymously herein.) With the aging of a sensor, some sensor pixels— which may be referred to herein as "affected ultrasonic receiver pixels"— may not continue to behave correctly when the same Dbias voltage is applied. Therefore, the Dbias voltage applied to the affected ultrasonic receiver pixels needs to be recalibrated in order to obtain better image quality. During recalibration according to previously-disclosed methods, the new Dbias voltage was applied to the entire ultrasonic receiver, including to the unaffected pixels. Accordingly, the new Dbias voltage may have been unnecessarily high for unaffected pixels. The unaffected pixels may have become saturated over time.

Some disclosed methods involve improved techniques for ultrasonic fingerprint sensor calibration. Some disclosed methods involve determining that a current bias voltage, which may be referred to herein as a "first bias voltage," is not sufficient for one or more affected ultrasonic receiver pixels of the ultrasonic receiver array. Some methods involve determining one or more affected regions of the ultrasonic receiver array in which the one or more affected ultrasonic receiver pixels are located. Some such examples may involve determining one or more unaffected regions of the ultrasonic receiver array in which the one or more affected ultrasonic receiver pixels are not located. Some examples involve determining a second bias voltage for the one or more affected regions and recalibrating the ultrasonic fingerprint sensor to apply the second bias voltage to the affected regions and to apply the first bias voltage to the one or more unaffected regions when the ultrasonic receiver array receives ultrasound signals. Accordingly, the second bias voltage, which will generally be a higher voltage than the first bias voltage, will only be applied to the affected regions.

Particular implementations of the subject matter described in this disclosure may be implemented to realize one or more of the following potential advantages. Some disclosed methods can reduce the power consumption of an ultrasonic fingerprint sensor system. In some such examples, less power is wasted by controlling the bias voltage to be no larger than needed for any particular region of an ultrasonic receiver. Applying a lower bias voltage to unaffected regions of the ultrasonic receiver may avoid saturation of unaffected pixels and may prolong the useful lifetime of an ultrasonic fingerprint sensor system. Moreover, applying an appropriate bias voltage to both affected and unaffected regions of the ultrasonic receiver may allow higher-quality image data to be obtained by the ultrasonic receiver and may therefore result in improved performance of the ultrasonic fingerprint sensor system.

FIG. 1 is a block diagram that shows example components of an apparatus according to some disclosed implementations. In this example, the apparatus 101 includes an ultrasonic sensor system 102 and a control system 106. Some implementations may include a touch sensor system 103, an interface system 104, a memory system 108, a display system 110, a microphone system 112, a loudspeaker system 114, a gesture sensor system 116, or combinations thereof.

According to some examples, the ultrasonic sensor system 102 may be, or may include, an ultrasonic fingerprint sensor. Alternatively, or additionally, in some implementations the ultrasonic sensor system 102 may be, or may include, another type of ultrasonic sensor, such as an ultrasonic sensor that is configured to receive ultrasound from another part of the human body, such as an ultrasonic sensor that resides in a wearable device (such as a wrist band), an ultrasonic sensor that resides in a patch, etc.

In some examples, the ultrasonic sensor system 102 may include an ultrasonic receiver array and a separate ultrasonic transmitter, or transmitter array. In some such examples, the ultrasonic transmitter may include an ultrasonic plane-wave generator. However, various examples of ultrasonic sensors are disclosed herein, some of which may include a separate ultrasonic transmitter and some of which may not. For example, in some implementations, the ultrasonic sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

In some examples, the ultrasonic sensor system 102 may be a component of a photoacoustic sensor system. In some such examples, the ultrasonic sensor system 102 may be, or may include, an ultrasonic receiver system that is configured for use with the photoacoustic sensor system.

Data received from fingerprint sensor implementations of the ultrasonic sensor system 102 may sometimes be referred to herein as "fingerprint sensor data," "fingerprint image data," etc., whether or not the received data corresponds to an actual digit or another object from which the ultrasonic sensor system 102 has received data. Such data will generally be received from the fingerprint sensor system in the form of electrical signals. Accordingly, without additional processing such image data would not necessarily be perceivable by a human being as an image. As used herein, the word "finger" may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the ultrasonic sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the ultrasonic sensor system 102. According to some such examples, the interface system 104 may couple at least a portion of the control system 106 to the ultrasonic sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the ultrasonic sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the ultrasonic sensor system 102, the touch sensor system 103, the memory system 108, the display system 110, the microphone system 112 and/or the loudspeaker system 114.

Some examples of the apparatus 101 may include dedicated components that are configured for controlling at least a portion of the ultrasonic sensor system 102 (and/or for processing data received from the ultrasonic sensor system 102). Although the control system 106 and the ultrasonic sensor system 102 are shown as separate components in FIG. 1, in some implementations at least a portion of the control system 106 and at least a portion of the ultrasonic sensor system 102 may be co-located. For example, in some implementations one or more components of the ultrasonic sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

According to some examples, the control system 106 may be configured to determine that a first bias voltage is not sufficient for one or more affected ultrasonic receiver pixels of the ultrasonic receiver array. In some examples, the control system 106 may be configured to determine one or more affected regions of the ultrasonic receiver array in which the one or more affected ultrasonic receiver pixels are located. According to some examples, the control system 106 may be configured to determine one or more unaffected regions of the ultrasonic receiver array in which the one or more affected ultrasonic receiver pixels are not located. In some examples, the control system 106 may be configured to determine a second bias voltage for the one or more affected regions. According to some examples, the control system 106 may be configured to recalibrate the ultrasonic fingerprint sensor to apply the second bias voltage to the affected regions and to apply the first bias voltage to the one or more unaffected regions when the ultrasonic receiver array receives ultrasound signals.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband, a belt or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
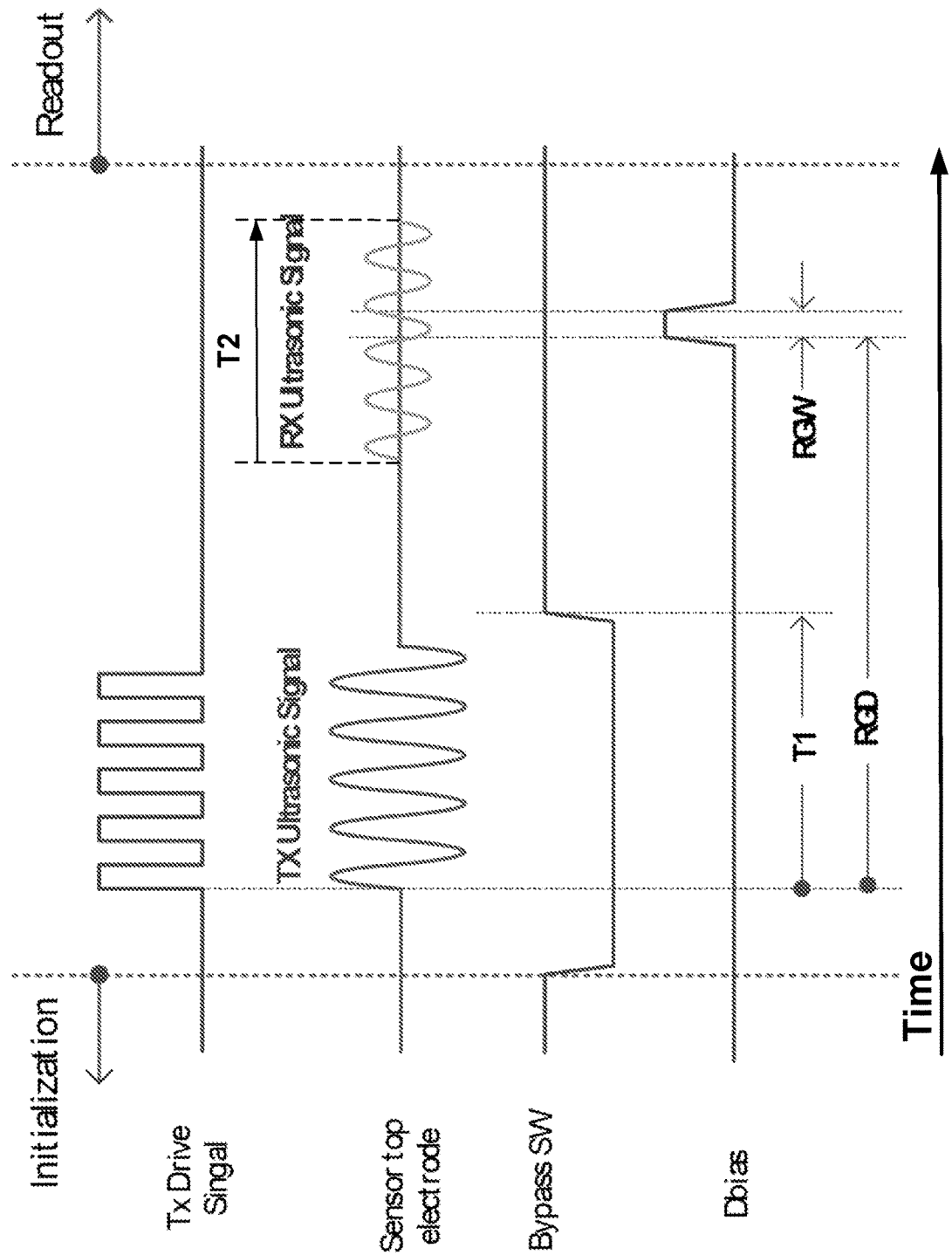
FIG. 2 shows examples of processes that are involved with transmitting and receiving ultrasonic waves.

FIG. 2 shows examples of processes that are involved with transmitting and receiving ultrasonic waves. The processes of FIG. 2 may, for example, be performed by the ultrasonic sensor system 102 of the apparatus 101 that is described with reference to FIG. 1, by the control system 106 of FIG. 1, or a combination thereof.

In the examples shown in FIG. 2, the transmission (TX) drive signals and corresponding ultrasonic transmission pulses are provided during time interval T1. Ultrasonic waves corresponding to reflections from a target object are received (RX) during a later time interval T2. Ultrasonic waves corresponding to reflections from the target object are sampled by an ultrasonic receiver during a time interval known as a range gate window (RGW), after a time interval known as a range gate delay (RGD). The RGD may, for example, be set according to a two-way travel time to and from a target of interest. In an ultrasonic fingerprint sensor context, one such target of interest may be the ridges and valleys of the epidermis of a finger that has been placed on an outer surface of an apparatus that includes the ultrasonic fingerprint sensor. Other such targets of interest may include sub-epidermal structures of a finger, a wrist, or other body part.

As with other disclosed examples, the types, numbers and arrangements of elements that are shown in FIG. 2 are merely presented by way of example. Other examples may include different types of elements, numbers of elements, arrangements of elements, or combinations thereof. For example, other implementations may involve transmitting more or fewer ultrasonic transmission pulses, may involve a shorter or longer RGD, a shorter or longer RGW, or combinations thereof. Some alternative examples may involve transmitting light instead of ultrasound. The transmitted light may induce one or more tissues, blood, etc., to emit ultrasonic waves that can be detected by an ultrasonic receiver array.

Over time, some ultrasonic receiver pixels (which may be referred to herein as "affected ultrasonic receiver pixels") may not behave correctly when the same bias voltage is applied. In some instances, there may be a noticeable degradation of image data quality due to sub-optimal behavior of affected ultrasonic receiver pixels. In an ultrasonic fingerprint sensor context, there may be a noticeable degradation of fingerprint image data caused by the sub-optimal behavior of affected ultrasonic receiver pixels. (As noted elsewhere herein, data received from fingerprint sensor implementations of the ultrasonic sensor system 102 may sometimes be referred to herein as "fingerprint sensor data," "fingerprint image data," etc., whether or not the received data corresponds to an actual digit or another object from which the ultrasonic sensor system 102 has received data. Such data will generally be received from the fingerprint sensor system in the form of electrical signals. Accordingly, without additional processing such image data would not necessarily be perceivable by a human being as an image.)

In order to improve the quality of fingerprint image data caused by affected ultrasonic receiver pixels, the bias voltage applied to the affected ultrasonic receiver pixels needs to be recalibrated, normally by increasing the bias voltage. During recalibration according to previously-disclosed methods, the new bias voltage was applied to the entire ultrasonic receiver, including to the unaffected pixels. Accordingly, the new bias voltage may be unnecessarily high for the unaffected pixels. The unaffected pixels may become saturated over time.

Some disclosed methods involve improved techniques for ultrasonic fingerprint sensor calibration. Some disclosed methods involve determining that a current bias voltage, which may be referred to herein as a "first bias voltage," is not appropriate (for example, is not high enough) for one or more affected ultrasonic receiver pixels of the ultrasonic receiver array. Some methods involve determining one or more affected regions of the ultrasonic receiver array in which the one or more affected ultrasonic receiver pixels are located. Some examples involve determining a second bias voltage for the one or more affected regions and recalibrating the ultrasonic fingerprint sensor to apply the second bias voltage only to the affected regions, not to the unaffected regions. In such examples, the first bias voltage will continued to be applied to unaffected regions. Accordingly, the second bias voltage, which will generally be a higher voltage than the first bias voltage, will only be applied to the affected regions.

Figure 3A:
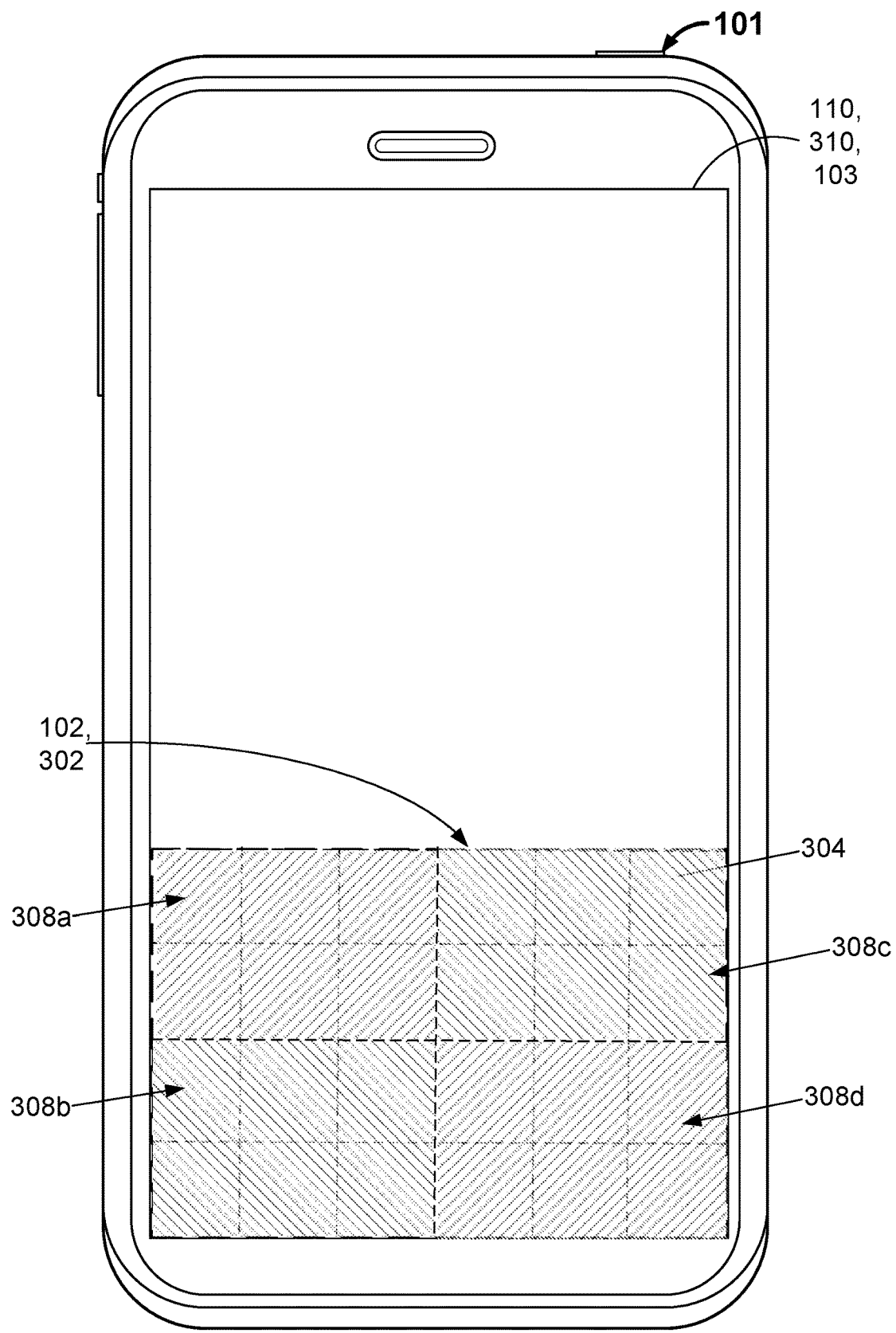
FIGS. 3A and 3B show examples of devices configured to perform at least some disclosed methods.
Figure 3B:
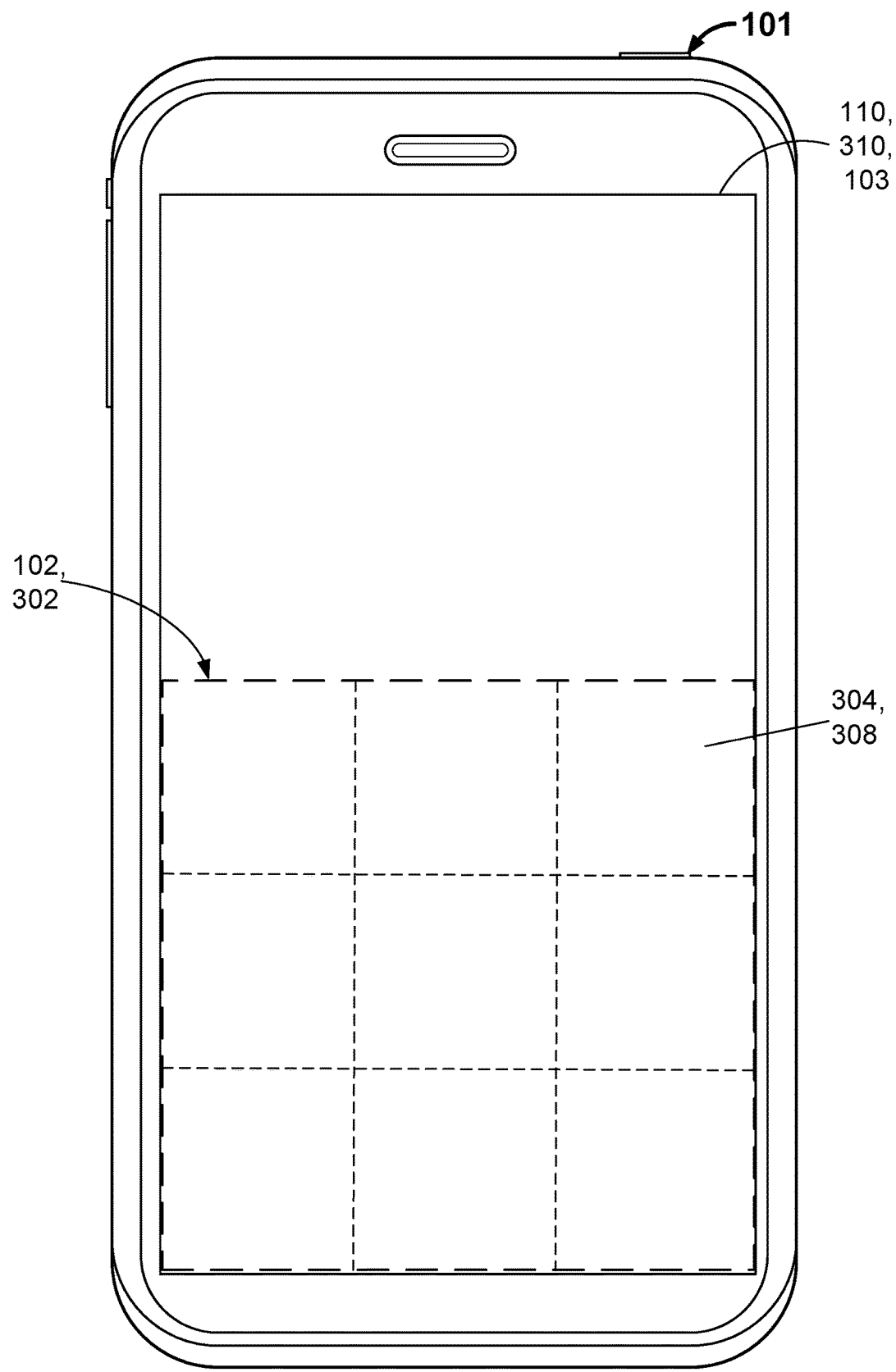

FIGS. 3A and 3B show examples of devices configured to perform at least some disclosed methods. As with other disclosed examples, the types, numbers and arrangements of elements that are shown in FIGS. 3A and 3B are merely presented by way of example. Other examples may include different types of elements, numbers of elements, arrangements of elements, or combinations thereof.

In the examples shown in FIGS. 3A and 3B, the apparatus 101 is an instance of the apparatus 101 of FIG. 1. In these implementations, the apparatus 101 is a mobile device that includes a ultrasonic sensor system 102, a control system 106 (not shown in FIGS. 3A and 3B) and a display system 110. The ultrasonic sensor system 102 may be, may include, or may be a component of, an ultrasonic fingerprint sensor system, another type of ultrasonic sensor system (such as an ultrasonic sensor system configured for implementation in a wearable device), a photoacoustic sensor system, etc.

According to these example, an active area 302 of the ultrasonic sensor system 102 is outlined in large dashes. The active area 302 may, for example, be an area that includes an array of sensor pixels, such as fingerprint sensor pixels, of the ultrasonic sensor system 102. The array of sensor pixels may include receiver pixels, transceiver pixels, etc., depending on the type of fingerprint sensor and the particular implementation. In the example shown in FIG. 3A, the active area 302 corresponds with approximately 40% of the display area 310 of the display system 110, whereas in the example shown in FIG. 3B the active area 302 corresponds with approximately half of the display area 310. In alternative implementations, the active area 302 may correspond with a larger portion or a smaller portion of the display area 310.

In the example shown in FIG. 3A, the active area 302 includes 24 fingerprint sensor tiles 304. According to this example, each of the fingerprint sensor tiles 304 includes a portion of the array of fingerprint sensor pixels of the active area 302. According to some implementations, the control system may be configured to selectively activate a portion of the active area 302 corresponding to one or more of the fingerprint sensor tiles 304. In some alternative implementations, the active area 302 may include more than 24 or fewer than 24 fingerprint sensor tiles 304. This disclosure is intended to encompass all such alternative implementations.

According to the example shown in FIG. 3A, the active area 302 has been divided into regions 308a, 308b, 308c and 308d, for the purpose of bias voltage calibration. In this example, the fingerprint sensor pixels in each of the 4 regions 308a-308d will be considered as a group, or a unit, for the purposes of determining an appropriate bias voltage, applying a bias voltage, etc. According to some examples, different bias voltages may be applied to different regions. For example, a first bias voltage may be applied to the region 308a and a second bias voltage may be applied to the region 308b. In this example, each of the 4 regions 308a-308d includes 6 fingerprint sensor tiles 304.

In some alternative examples, each region may include more or fewer than 6 fingerprint sensor tiles 304. In the example shown in FIG. 3B, each of the sensor tiles 304 corresponds to a region 308. According to this example, the active area 302 includes nine fingerprint sensor tiles 304.

Figure 4:
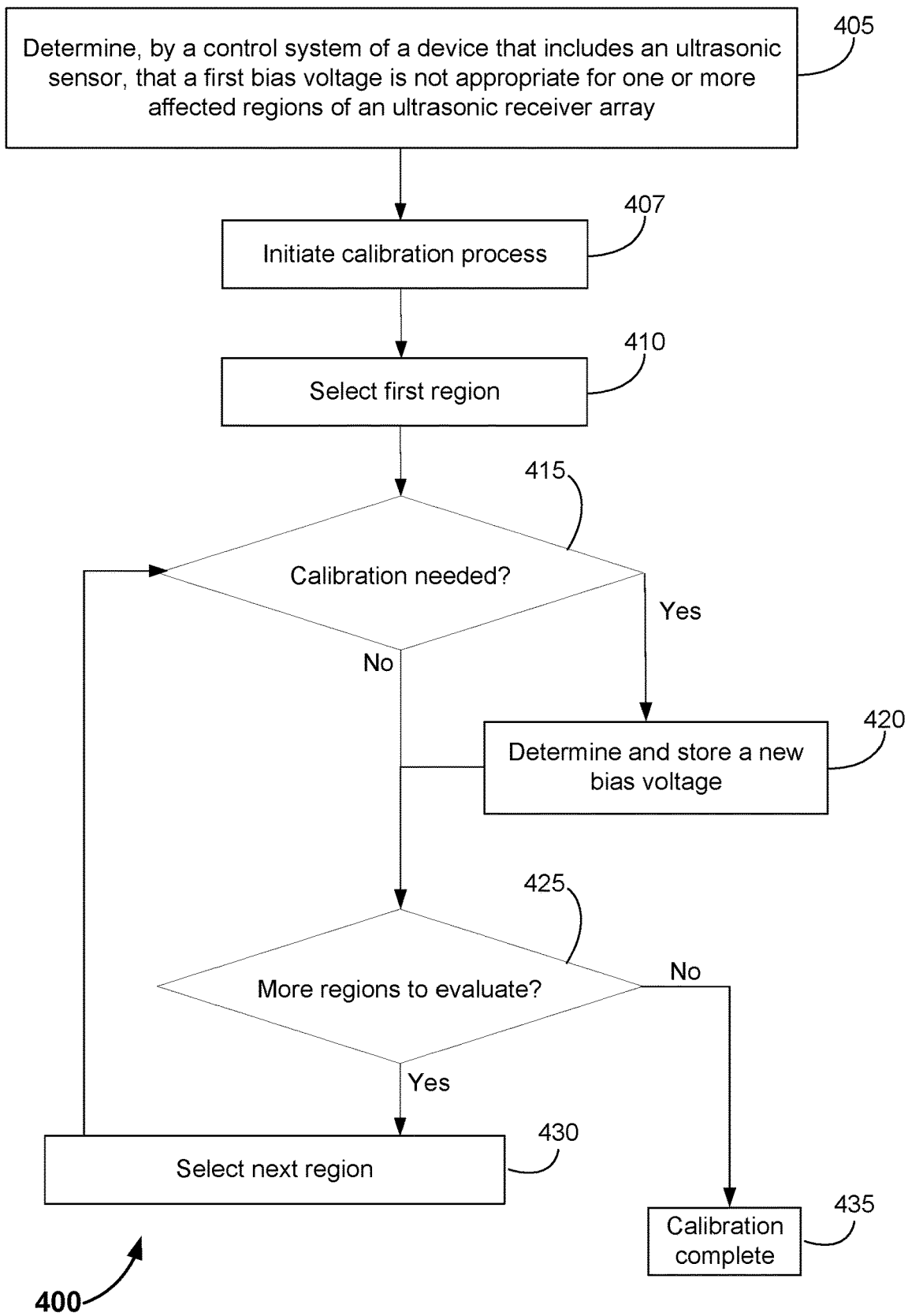
FIG. 4 is a flow diagram that presents examples of operations according to some disclosed methods.

FIG. 4 is a flow diagram that presents examples of operations according to some disclosed methods. The blocks of FIG. 4 may be performed by an apparatus that includes at least a fingerprint sensor system and a control system. The blocks of FIG. 4 may, for example, be performed by the apparatus 101 of FIG. 1 or by a similar apparatus. For example, in some implementations the control system 106 of FIG. 1 may be configured to perform, at least in part, the operations that are described herein with reference to FIG. 4. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 4 may include more or fewer blocks than indicated. Moreover, the blocks of methods disclosed herein are not necessarily performed in the order indicated. In some implementations, one or more blocks may be performed concurrently.

According to this example, method 400 is a method of controlling an ultrasonic sensor. More specifically, method 400 is a method of calibrating an ultrasonic sensor.

In this example, block 405 involves determining, by a control system of a device that includes the ultrasonic fingerprint sensor, that a first bias voltage is not appropriate for one or more affected ultrasonic receiver pixels of an ultrasonic receiver array. According to some examples, the first bias voltage is a bias voltage that has recently been applied, or is currently being applied, during time intervals in which the ultrasonic receiver array has been receiving ultrasound signals. According to some examples, determining that the first bias voltage is not appropriate involves determining that the first bias voltage is too low for the affected ultrasonic receiver pixels.

In some examples, the control system may determine in block 405 that there are one or more defective ultrasonic receiver pixels in at least one region of the ultrasonic receiver array. According to some examples, the control system may determine in block 405 that there is at least, or more than, a threshold number of defective ultrasonic receiver pixels in at least one region of the ultrasonic receiver array. According to some such examples, the threshold number may be 5, 10, 15, 20, 25, 30, 35, 40, or some other threshold number. In some examples, the control system may determine in block 405 that the image quality of sensor data received from at least one region of the ultrasonic receiver array is below a threshold level of image quality. According to some examples, fingerprint data quality or image quality may be quantified based on a signal-to-noise ratio (SNR), such as the ratio of the fingerprint signal level to a background noise level. In some examples, fingerprint data quality or image quality may be quantified by comparing one or more parameters such as contrast, gain, useful fingerprint features for matching, or combinations thereof. According to some examples, categories such as "normal finger," "dry-finger," "challenging finger" (for example, with destroyed ridge and valley patterns due to prolonged use of the finger) may be used to define one or more fingerprint data quality thresholds. Alternatively, or additionally, block 405 may involve evaluating a grayscale level range. In some such examples, block 405 may involve evaluating minimum grayscale levels, maximum grayscale levels, threshold grayscale levels, or combinations thereof. Alternatively, or additionally, block 405 may involve performing one or more polarity checks.

In some examples, the control system may be configured to perform a periodic process of evaluating defective pixels, image quality, etc. According to some such examples, block 405 may be a result of such an evaluation process.

In this example, block 407 involves initiating a calibration process. Block 407 may, for example, involve the control system accessing a data structure of a memory in which information about regions of the ultrasonic receiver array. The data structure may, for example, indicate which fingerprint sensor tile or tiles correspond to each region of the ultrasonic receiver array, the current bias voltage for each region, etc. In some examples, the data structure may indicate which sensor pixels of the ultrasonic receiver array correspond to each region.

According to this example, block 410 involves selecting a first region of the ultrasonic receiver array to evaluate. In some examples, the data structure referred to above with reference to block 407, or another data structure, may indicate a first region of the ultrasonic receiver array to evaluate. According to some examples, the data structure may include information regarding which region or regions of the ultrasonic receiver array include defective pixels, more than a threshold number of defective pixels, have been providing image data of below a threshold quality level, one or more other region quality metrics, or combinations thereof. However, in some examples block 410 may involve simply selecting the first region of a predetermined sequence of regions, randomly selecting a first region for evaluation, etc. Referring to FIG. 3A, for example, block 410 may involve selecting region 308a as the first region.

In this example, block 415 involves determining whether the first region, or any subsequent region, needs to be calibrated. Block 415 may, for example, involve evaluating whether the first region, or any subsequent region, includes defective pixels, includes more than a threshold number of defective pixels, has recently been providing image data of below a threshold quality level, one or more other region quality metrics, or combinations thereof.

If it is determined in block 415 that the region currently being evaluated needs to be calibrated, the process continues to block 420. In some examples, block 415 may involve evaluating whether of the region currently being evaluated needs to be calibrated, for example according to one of the criteria noted above with regard to block 405. In some examples, block 415 may involve accessing a data structure that includes stored results of a recent evaluation of the region currently under consideration.

According to this example, block 420 involves determining a new bias voltage for the region currently being evaluated. In some such examples, block 420 may involve referring to a pre-defined range of bias voltages that is best suited for sensor pixels of a particular ultrasonic receiver array. Some such examples may involve search over a minimum to maximum range of bias voltages, for example with a predetermined bias voltage step size. According to some such examples, the range of bias voltages, the step size, or both, may be stored in a memory of the control system, or a memory that is accessible by the control system. In some such examples, block 420 may involve adjusting the bias voltage value+/−step*n_steps based on polarity, grayscale level, one or more other metrics, or combinations thereof. In some such examples, polarity checks may be used to test the feasibility of bias voltage tuning. A higher voltage should result in darker images and a lower voltage should result in lighter images. According to some examples, only when such differences are obtained, or observed, is the sensor considered to be tunable. In some examples, a voltage step may be 0.125 V. Other examples may involve larger or smaller voltage steps. According to some examples, a mean voltage (an average of a low and a high voltage) may be selected to start the tuning process. With a particular voltage and a range of RGD values, a target image may be scanned and the mean, 1 percentile low and 99 percentile max values may be plotted in order to determine whether the values are near an optimal range. In one 32-bit example in which the maximum value for a pixel is 65535, the process may involve determining whether the values are close to the middle of the possible range of values, such as approximately 32000, with an acceptable delta (such as approximately 2500). In the example shown in FIG. 4, block 420 involves storing the new bias voltage for future use.

According to this example, If it is determined in block 415 that the region currently being evaluated does not need to be calibrated, or after a new bias voltage has been determined in block 420, the process continues to block 425. Here, block 425 involves determining whether there are any additional regions to evaluate. For example, referring again to the example of FIG. 3A, if region 308a was selected as the first region and regions 308b-308d had not yet been evaluated, it would be determined in block 425 that there are additional regions to evaluate. According to this example, the process would continue to block 430.

In this example, block 430 involves selecting the next region to evaluate. For example, referring again to the example of FIG. 3A, if region 308a had been selected as the first region and regions 308b-308d had not yet been evaluated, block 430 would involve selecting one of the regions 308b-308d as the next region to evaluate. In some examples, block 430 may involve selecting the next region to evaluate according to a predetermined sequence. In other examples, block 430 may involve randomly selecting the next region to evaluate.

According to this example, at least blocks 415 and 420, and also block 420 as needed, would be performed until it is determined in block 425 that there are no additional regions to evaluate. In this example, the process would proceed to block 435, indicating that the calibration process has completed.

Figure 5:
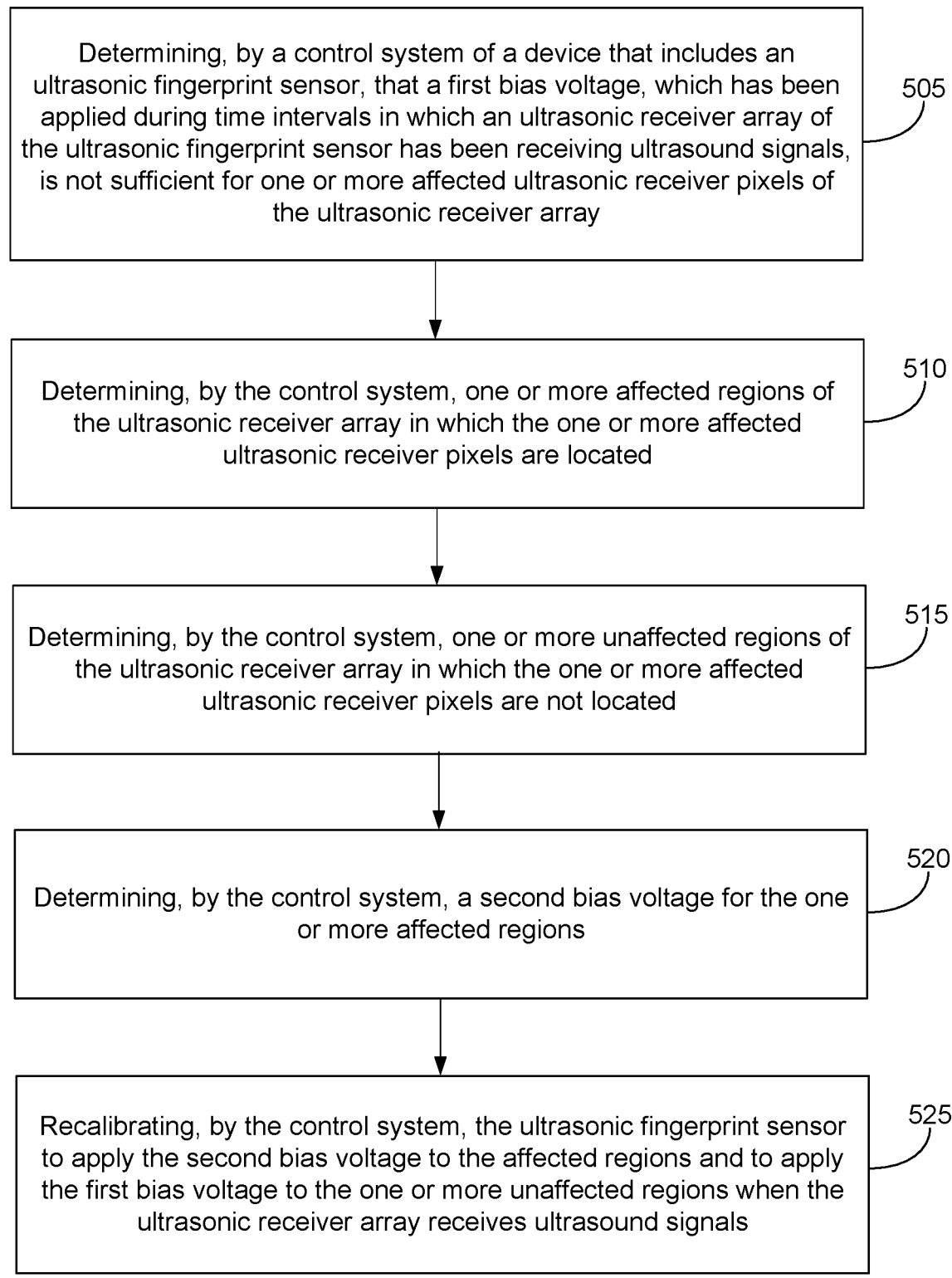
FIG. 5 is a flow diagram that presents examples of operations according to some additional disclosed methods.

FIG. 5 is a flow diagram that presents examples of operations according to some additional disclosed methods. The blocks of FIG. 5 may be performed by an apparatus that includes at least a fingerprint sensor system and a control system. The blocks of FIG. 5 may, for example, be performed by the apparatus 101 of FIG. 1 or by a similar apparatus. For example, in some implementations the control system 106 of FIG. 1 may be configured to perform, at least in part, the operations that are described herein with reference to FIG. 5. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

According to this example, method 500 is a method of controlling an ultrasonic sensor. More specifically, method 500 is a method of calibrating an ultrasonic sensor.

In this example, block 505 involves determining, by a control system of a device that includes the ultrasonic fingerprint sensor, that a first bias voltage, which has been applied during time intervals in which an ultrasonic receiver array of the ultrasonic fingerprint sensor has been receiving ultrasound signals, is not sufficient for one or more affected ultrasonic receiver pixels of the ultrasonic receiver array. The affected ultrasonic receiver pixels may be defective affected ultrasonic receiver pixels, such as temporarily malfunctioning ultrasonic receiver pixels.

In some examples, the control system may determine in block 505 that there are one or more defective ultrasonic receiver pixels (such as in at least one region of the ultrasonic receiver array. According to some examples, the control system may determine in block 505 that there is at least, or more than, a threshold number of defective ultrasonic receiver pixels in at least one region of the ultrasonic receiver array. According to some such examples, the threshold number may be 5, 10, 15, 20, 25, 30, 35, 40, or some other threshold number. In some examples, the control system may determine in block 505 that the image quality of sensor data received from at least one region of the ultrasonic receiver array is below a threshold level of image quality.

In some examples, the control system may be configured to perform a periodic process of evaluating defective pixels, image quality, etc. According to some such examples, block 505 may be a result of such an evaluation process.

According to this example, block 510 involves determining, by the control system, one or more affected regions of the ultrasonic receiver array in which the one or more affected ultrasonic receiver pixels are located. In this example, block 515 involves determining, by the control system, one or more unaffected regions of the ultrasonic receiver array in which the one or more affected ultrasonic receiver pixels are not located. According to some examples, the one or more affected regions and the one or more unaffected regions may be determined during a process of evaluating each region of a plurality of regions of the ultrasonic receiver array. Some such examples are described with reference to FIG. 4.

In this example, block 520 involves determining, by the control system, a second bias voltage for the one or more affected regions. According to this example, block 525 involves recalibrating, by the control system, the ultrasonic fingerprint sensor to apply the second bias voltage to the affected regions and to apply the first bias voltage to the one or more unaffected regions when the ultrasonic receiver array receives ultrasound signals.

In some alternative examples, it may be determined in method 500 that there are no unaffected regions of the ultrasonic receiver array. In some such examples, method 500 may involve recalibrating all regions of the ultrasonic receiver array.

According to some examples, method 500 may involve determining a third bias voltage for one or more regions of the ultrasonic receiver array. In some such examples, a first subset of affected regions may be recalibrated with the second bias voltage and a second subset of affected regions may be recalibrated with the third bias voltage.

The first bias voltage may or may not be the first bias voltage that has ever been applied to the ultrasonic receiver array. The first bias voltage may, in some examples, correspond to a voltage determined during a factory calibration process. However, in some examples the first bias voltage may correspond to a bias voltage determined during a prior recalibration process.

In some examples, the ultrasonic receiver array may include a plurality of tiles. Each tile of the plurality of tiles may include a plurality of ultrasonic receiver pixels. Some examples are described herein with reference to FIGS. 3A and 3B. In some examples, such as that shown in FIG. 3A, each region may include a plurality of tiles. In some such examples, the affected regions and the unaffected regions may each include a plurality of tiles. However, according to other examples, such as that shown in FIG. 3B, each region may include only a single tile. In some such examples, the affected regions and the unaffected regions may each include a single tile.

According to some examples, each region of the ultrasonic receiver array may occupy half of, or less than half of, the ultrasonic receiver array. FIGS. 3A and 3B show two examples of the latter. In some examples, each region of the ultrasonic receiver array may occupy approximately ½, approximately ¼, approximately ⅙, approximately ⅛, approximately ⅑, approximately ¹⁄₁₀, approximately ¹⁄₁₂, approximately ¹⁄₁₆, approximately ¹⁄₂₀ or approximately ¹⁄₂₄ of the ultrasonic receiver array. As used herein, "approximately" may mean plus or minus 5%, plus or minus 10%, plus or minus 15%, plus or minus 20%, plus or minus 25%, etc.

Implementation examples are described in the following numbered clauses:

1. A method of controlling an ultrasonic fingerprint sensor, the method including: determining, by a control system of a device that includes the ultrasonic fingerprint sensor, that a first bias voltage, which has been applied during time intervals in which an ultrasonic receiver array of the ultrasonic fingerprint sensor has been receiving ultrasound signals, is not sufficient for one or more affected ultrasonic receiver pixels of the ultrasonic receiver array; determining, by the control system, one or more affected regions of the ultrasonic receiver array in which the one or more affected ultrasonic receiver pixels are located; determining, by the control system, one or more unaffected regions of the ultrasonic receiver array in which the one or more affected ultrasonic receiver pixels are not located; determining, by the control system, a second bias voltage for the one or more affected regions; and recalibrating, by the control system, the ultrasonic fingerprint sensor to apply the second bias voltage to the affected regions and to apply the first bias voltage to the one or more unaffected regions when the ultrasonic receiver array receives ultrasound signals.

2. The method of clause 1, where the first bias voltage corresponds to a voltage determined during a factory calibration process.

3. The method of clause 1, where the first bias voltage corresponds to a bias voltage determined during a prior recalibration process.

4. The method of any one of clauses 1-3, where the one or more affected ultrasonic receiver pixels are temporarily malfunctioning ultrasonic receiver pixels.

5. The method of any one of clauses 1-4, where the one or more affected regions and the one or more unaffected regions are determined during a process of evaluating each region of a plurality of regions of the ultrasonic receiver array.

6. The method of any one of clauses 1-5, where the ultrasonic receiver array includes a plurality of tiles, each tile of the plurality of tiles including a plurality of ultrasonic receiver pixels.

7. The method of clause 6, where the affected regions and the unaffected regions each include a plurality of tiles.

8. The method of clause 6, where the affected regions and the unaffected regions each include a single tile.

9. The method of any one of clauses 1-8, where each region of the ultrasonic receiver array occupies less than half of the ultrasonic receiver array.

10. The method of clause 9, where each region of the ultrasonic receiver array occupies approximately ¼, ⅙, ⅛, ¹⁄₁₀, ¹⁄₁₂ or ¹⁄₁₆ of the ultrasonic receiver array.

11. An apparatus, including: an ultrasonic fingerprint sensor including an ultrasonic receiver array; and a control system configured for communication with the an ultrasonic fingerprint sensor, the control system being further configured to: determine that a first bias voltage, which has been applied during time intervals in which the ultrasonic receiver array has been receiving ultrasound signals, is not sufficient for one or more affected ultrasonic receiver pixels of the ultrasonic receiver array; determine one or more affected regions of the ultrasonic receiver array in which the one or more affected ultrasonic receiver pixels are located; determine one or more unaffected regions of the ultrasonic receiver array in which the one or more affected ultrasonic receiver pixels are not located; determine a second bias voltage for the one or more affected regions; and recalibrate the ultrasonic fingerprint sensor to apply the second bias voltage to the affected regions and to apply the first bias voltage to the one or more unaffected regions when the ultrasonic receiver array receives ultrasound signals.

12. The apparatus of clause 11, where the first bias voltage corresponds to a voltage determined during a factory calibration process.

13. The apparatus of clause 11, where the first bias voltage corresponds to a bias voltage determined during a prior recalibration process.

14. The apparatus of any one of clauses 11-13, where the one or more affected ultrasonic receiver pixels are temporarily malfunctioning ultrasonic receiver pixels.

15. The apparatus of any one of clauses 11-14, where the one or more affected regions and the one or more unaffected regions are determined during a process of evaluating each region of a plurality of regions of the ultrasonic receiver array.

16. The apparatus of any one of clauses 11-15, where the ultrasonic receiver array includes a plurality of tiles, each tile of the plurality of tiles including a plurality of ultrasonic receiver pixels.

17. The apparatus of clause 16, where the affected regions and the unaffected regions each include a plurality of tiles.

18. The apparatus of clause 16, where the affected regions and the unaffected regions each include a single tile.

19. The apparatus of any one of clauses 11-18, where each region of the ultrasonic receiver array occupies less than half of the ultrasonic receiver array.

20. The apparatus of clause 19, where each region of the ultrasonic receiver array occupies approximately ¼, ⅙, ⅛, ¹⁄₁₀, ¹⁄₁₂ or ¹⁄₁₆ of the ultrasonic receiver array.

21. One or more non-transitory media having instructions stored thereon for performing a method of controlling an ultrasonic fingerprint sensor, the method including: determining that a first bias voltage, which has been applied during time intervals in which the ultrasonic receiver array has been receiving ultrasound signals, is not sufficient for one or more affected ultrasonic receiver pixels of the ultrasonic receiver array; determining one or more affected regions of the ultrasonic receiver array in which the one or more affected ultrasonic receiver pixels are located; determining one or more unaffected regions of the ultrasonic receiver array in which the one or more affected ultrasonic receiver pixels are not located; determining a second bias voltage for the one or more affected regions; and recalibrating the ultrasonic fingerprint sensor to apply the second bias voltage to the affected regions and to apply the first bias voltage to the one or more unaffected regions when the ultrasonic receiver array receives ultrasound signals.

22. The one or more non-transitory media of clause 21, where the first bias voltage corresponds to a voltage determined during a factory calibration process.

23. The one or more non-transitory media of clause 21, where the first bias voltage corresponds to a bias voltage determined during a prior recalibration process.

24. The one or more non-transitory media of any one of clauses 21-23, where the one or more affected ultrasonic receiver pixels are temporarily malfunctioning ultrasonic receiver pixels.

25. The one or more non-transitory media of any one of clauses 21-24, where the one or more affected regions and the one or more unaffected regions are determined during a process of evaluating each region of a plurality of regions of the ultrasonic receiver array.

26. An apparatus, including: an ultrasonic fingerprint sensor including an ultrasonic receiver array; and control means for: determining that a first bias voltage, which has been applied during time intervals in which the ultrasonic receiver array has been receiving ultrasound signals, is not sufficient for one or more affected ultrasonic receiver pixels of the ultrasonic receiver array; determining one or more affected regions of the ultrasonic receiver array in which the one or more affected ultrasonic receiver pixels are located; determining one or more unaffected regions of the ultrasonic receiver array in which the one or more affected ultrasonic receiver pixels are not located; determining a second bias voltage for the one or more affected regions; and recalibrating the ultrasonic fingerprint sensor to apply the second bias voltage to the affected regions and to apply the first bias voltage to the one or more unaffected regions when the ultrasonic receiver array receives ultrasound signals.

27. The apparatus of clause 26, where the first bias voltage corresponds to a voltage determined during a factory calibration process.

28. The apparatus of clause 26, where the first bias voltage corresponds to a bias voltage determined during a prior recalibration process.

29. The apparatus of any one of clauses 26-28, where the one or more affected ultrasonic receiver pixels are temporarily malfunctioning ultrasonic receiver pixels.

30. The apparatus of any one of clauses 26-29, where the one or more affected regions and the one or more unaffected regions are determined during a process of evaluating each region of a plurality of regions of the ultrasonic receiver array.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of controlling an ultrasonic fingerprint sensor, the method comprising:
   determining, by a control system of a device that includes the ultrasonic fingerprint sensor, that a first bias voltage, which has been applied during time intervals in which an ultrasonic receiver array of the ultrasonic fingerprint sensor has been receiving ultrasound signals, is not sufficient for one or more affected ultrasonic receiver pixels of the ultrasonic receiver array;
   determining, by the control system, one or more affected regions of the ultrasonic receiver array in which the one or more affected ultrasonic receiver pixels are located;
   determining, by the control system, one or more unaffected regions of the ultrasonic receiver array in which the one or more affected ultrasonic receiver pixels are not located;
   determining, by the control system, a second bias voltage for the one or more affected regions; and
   recalibrating, by the control system, the ultrasonic fingerprint sensor to apply the second bias voltage to the affected regions and to apply the first bias voltage to the one or more unaffected regions when the ultrasonic receiver array receives ultrasound signals.

2. The method of claim 1, wherein the first bias voltage corresponds to a voltage determined during a factory calibration process.

3. The method of claim 1, wherein the first bias voltage corresponds to a bias voltage determined during a prior recalibration process.

4. The method of claim 1, wherein the one or more affected ultrasonic receiver pixels are temporarily malfunctioning ultrasonic receiver pixels.

5. The method of claim 1, wherein the one or more affected regions and the one or more unaffected regions are determined during a process of evaluating each region of a plurality of regions of the ultrasonic receiver array.

6. The method of claim 1, wherein the ultrasonic receiver array includes a plurality of tiles, each tile of the plurality of tiles including a plurality of ultrasonic receiver pixels.

7. The method of claim 6, wherein the affected regions and the unaffected regions each include a plurality of tiles.

8. The method of claim 6, wherein the affected regions and the unaffected regions each include a single tile.

9. The method of claim 1, wherein each region of the ultrasonic receiver array occupies less than half of the ultrasonic receiver array.

10. The method of claim 9, wherein each region of the ultrasonic receiver array occupies approximately $\frac{1}{4}$, $\frac{1}{6}$, $\frac{1}{8}$, $\frac{1}{10}$, $\frac{1}{12}$ or $\frac{1}{16}$ of the ultrasonic receiver array.

11. An apparatus, comprising:
    an ultrasonic fingerprint sensor including an ultrasonic receiver array; and
    a control system configured for communication with the ultrasonic fingerprint sensor, the control system being further configured to:
       determine that a first bias voltage, which has been applied during time intervals in which the ultrasonic receiver array has been receiving ultrasound signals, is not sufficient for one or more affected ultrasonic receiver pixels of the ultrasonic receiver array;
       determine one or more affected regions of the ultrasonic receiver array in which the one or more affected ultrasonic receiver pixels are located;
       determine one or more unaffected regions of the ultrasonic receiver array in which the one or more affected ultrasonic receiver pixels are not located;
       determine a second bias voltage for the one or more affected regions; and
       recalibrate the ultrasonic fingerprint sensor to apply the second bias voltage to the affected regions and to apply the first bias voltage to the one or more unaffected regions when the ultrasonic receiver array receives ultrasound signals.

12. The apparatus of claim 11, wherein the first bias voltage corresponds to a voltage determined during a factory calibration process.

13. The apparatus of claim 11, wherein the first bias voltage corresponds to a bias voltage determined during a prior recalibration process.

14. The apparatus of claim 11, wherein the one or more affected ultrasonic receiver pixels are temporarily malfunctioning ultrasonic receiver pixels.

15. The apparatus of claim 11, wherein the one or more affected regions and the one or more unaffected regions are determined during a process of evaluating each region of a plurality of regions of the ultrasonic receiver array.

16. The apparatus of claim 11, wherein the ultrasonic receiver array includes a plurality of tiles, each tile of the plurality of tiles including a plurality of ultrasonic receiver pixels.

17. The apparatus of claim 16, wherein the affected regions and the unaffected regions each include a plurality of tiles.

18. The apparatus of claim 16, wherein the affected regions and the unaffected regions each include a single tile.

19. The apparatus of claim 11, wherein each region of the ultrasonic receiver array occupies less than half of the ultrasonic receiver array.

20. The apparatus of claim 19, wherein each region of the ultrasonic receiver array occupies approximately 1/4, 1/6, 1/8, 1/10, 1/12 or 1/16 of the ultrasonic receiver array.

21. One or more non-transitory media having instructions stored thereon for performing a method of controlling an ultrasonic fingerprint sensor, the method comprising:
   determining that a first bias voltage, which has been applied during time intervals in which the ultrasonic receiver array has been receiving ultrasound signals, is not sufficient for one or more affected ultrasonic receiver pixels of the ultrasonic receiver array;
   determining one or more affected regions of the ultrasonic receiver array in which the one or more affected ultrasonic receiver pixels are located;
   determining one or more unaffected regions of the ultrasonic receiver array in which the one or more affected ultrasonic receiver pixels are not located;
   determining a second bias voltage for the one or more affected regions; and
   recalibrating the ultrasonic fingerprint sensor to apply the second bias voltage to the affected regions and to apply the first bias voltage to the one or more unaffected regions when the ultrasonic receiver array receives ultrasound signals.

22. The one or more non-transitory media of claim 21, wherein the first bias voltage corresponds to a voltage determined during a factory calibration process.

23. The one or more non-transitory media of claim 21, wherein the first bias voltage corresponds to a bias voltage determined during a prior recalibration process.

24. The one or more non-transitory media of claim 21, wherein the one or more affected ultrasonic receiver pixels are temporarily malfunctioning ultrasonic receiver pixels.

25. The one or more non-transitory media of claim 21, wherein the one or more affected regions and the one or more unaffected regions are determined during a process of evaluating each region of a plurality of regions of the ultrasonic receiver array.

26. An apparatus, comprising:
   an ultrasonic fingerprint sensor including an ultrasonic receiver array; and
   control means for:
      determining that a first bias voltage, which has been applied during time intervals in which the ultrasonic receiver array has been receiving ultrasound signals, is not sufficient for one or more affected ultrasonic receiver pixels of the ultrasonic receiver array;
      determining one or more affected regions of the ultrasonic receiver array in which the one or more affected ultrasonic receiver pixels are located;
      determining one or more unaffected regions of the ultrasonic receiver array in which the one or more affected ultrasonic receiver pixels are not located;
      determining a second bias voltage for the one or more affected regions; and
      recalibrating the ultrasonic fingerprint sensor to apply the second bias voltage to the affected regions and to apply the first bias voltage to the one or more unaffected regions when the ultrasonic receiver array receives ultrasound signals.

27. The apparatus of claim 26, wherein the first bias voltage corresponds to a voltage determined during a factory calibration process.

28. The apparatus of claim 26, wherein the first bias voltage corresponds to a bias voltage determined during a prior recalibration process.

29. The apparatus of claim 26, wherein the one or more affected ultrasonic receiver pixels are temporarily malfunctioning ultrasonic receiver pixels.

30. The apparatus of claim 26, wherein the one or more affected regions and the one or more unaffected regions are determined during a process of evaluating each region of a plurality of regions of the ultrasonic receiver array.

* * * * *